March 30, 1954  J. B. WINTHER  2,673,947
RECTIFYING APPARATUS FOR INDUCTIVE ELECTRICAL LOADS
Filed March 23, 1951  2 Sheets-Sheet 1

Jerrold B. Winther,
Inventor.
Koenig and Pope,
Attorneys

March 30, 1954  J. B. WINTHER  2,673,947
RECTIFYING APPARATUS FOR INDUCTIVE ELECTRICAL LOADS
Filed March 23, 1951  2 Sheets-Sheet 2

Jerrold B. Winther,
Inventor.
Koenig and Pope.
Attorneys.

UNITED STATES PATENT OFFICE 2,673,947

RECTIFYING APPARATUS FOR INDUCTIVE ELECTRICAL LOADS

Jerrold B. Winther, Kenosha, Wis., assignor, by mesne assignments, to Eaton Manufacturing Company, Cleveland, Ohio, a corporation of Ohio Application March 23, 1951, Serial No. 217,180

3 Claims. (Cl. 317—156)

This invention relates to rectifying apparatus, and more particularly, to mechanical rectifiers for inductive electrical loads.

Heretofore, commutating rectifiers have not been entirely satisfactory because of commutating difficulties presented by inductive loads, and because of the large ripple content when the load is non-inductive. The current surge occurring when the supply circuit to an inductive load is opened causes arcing at the switch contacts and consequent contact damage. Various solutions to the problem have been proposed, among which are the provision of resistances to absorb the short-circuit arc on the commutator, extra brushes, and saturable reactors. This invention provides comparatively simple synchronous commutator rectifying apparatus that minimizes contact arcing, while permitting relatively large inductance in the load.

Briefly, my rectifying apparatus comprises switch contacts connected in series between an A. C. source and an inductive load, and a valve-type rectifier connected across the inductive load. Synchronous motor means operates the switch contacts so that the switch contacts are closed only when the voltage of the A. C. source applied to the inductive load is opposite to that for current flow through the valve-type rectifier. The switch contacts are opened before the voltage of the A. C. source swings to the opposite polarity which would result in the rectifier functioning as a short circuit for the power supply. In order to vary the current supplied to the load, the switch contacts may be opened and closed at variable times or phase relative to the cycle of the A. C. source, suitable apparatus being shown for such purpose. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a circuit diagram of the apparatus of this invention, showing the voltage and current conditions when the switch contacts are closed;

Similar reference characters indicate corresponding parts throughout the several views of the drawings.

Figure 1:
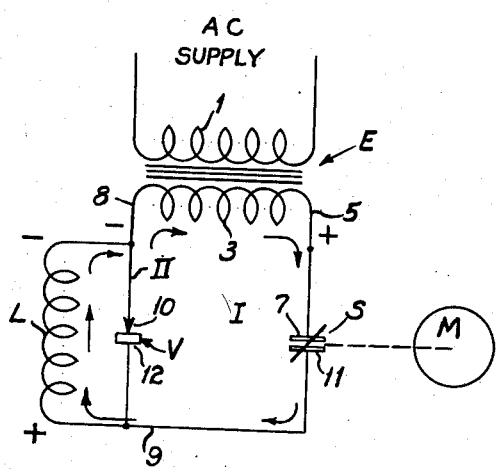

Referring now to Fig. 1 of the drawings, there is shown a circuit of this invention including a single-phase A. C. voltage supply E including a transformer, although the connections could be made directly to a power supply. A primary 1 of the transformer is connected to a conventional 60-cycle power source having a sinusoidal voltage wave, and a transformer secondary 3 is connected at one end 5 to one contact 7 of a switch S and at the other end 8 to one terminal of an inductive load L. The other terminal of the load is connected at 9 to another contact 11 of the switch S. Thus, there is provided a primary circuit I, including in series the transformer secondary 3, the switch S and the inductive load L.

A branch circuit II is provided by a valve-type rectifying element V connected across the inductive load L. By a valve-type rectifier is meant a nonlinear device that inherently presents a low voltage drop (preferably 10 volts or less) to current flow from a first electrode to a second electrode and a relatively high impedance or voltage drop to current flow from the second electrode to the first electrode. Such devices include copper-oxide, selenium and hot cathode vacuum-tube types of rectifiers. These rectifying elements are generically low voltage, non-polarizing, non-regenerative, low capacitance dry types as contrasted with the electrolytic type. In the drawings herein, the first electrode is designated 10 and the second electrode 12.

Figure 2:
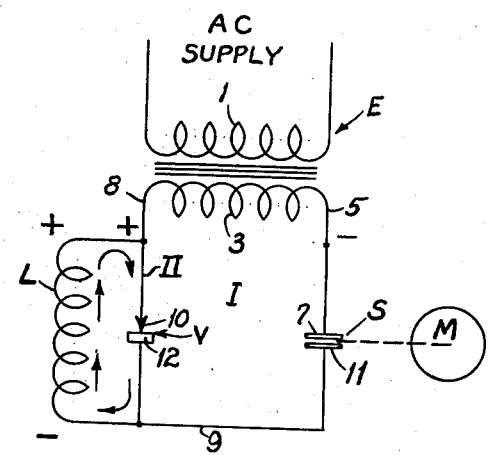
Fig. 2 is a circuit diagram similar to that of Fig. 1, showing the current and voltage conditions when the switch contacts are open.
Figure 4:
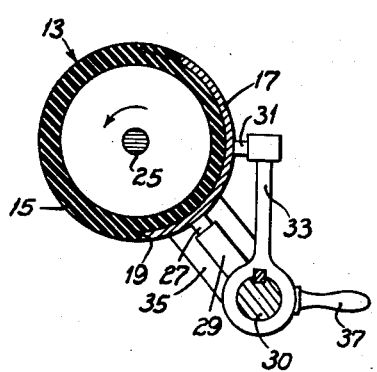
Fig. 4 is a section taken on line 4—4 of Fig. 3.

Broadly, the switch is closed when the voltage from E is of the polarity as shown in Fig. 1 with conductor 5 positive with respect to conductor 8 so that the first electrode 10 of the valve-type rectifier V is negative. Current then flows as indicated by the arrows on Fig. 1 through the inductive load L, the rectifier element V substantially preventing current flow through the branch circuit II. The switch S is opened before the voltage from E swings to the opposite polarity as indicated in Fig. 2. When the current in the main circuit is interrupted at the switch S, the field built up in the inductive load collapses, thereby inducing a voltage across the inductive load. The polarity of this inverse voltage is such that current continues to flow through the inductive load and through the rectifier V forming the branch circuit II, as indicated by the arrows in Fig. 2, the first electrode 10 of the rectifier V then being of positive polarity. The voltage drop of a selenium valve-type rectifier may be as low as 5 volts. If the inductance is of a large value, the load current will be of substantially constant magnitude; for example, the ripple content of the load current may be as low as 2% of the average current. Such large inductances are presented by the field coils of dynamoelectric machines, for example, eddy-current slip couplings, dynamometers, brakes and the like.

Figure 3:
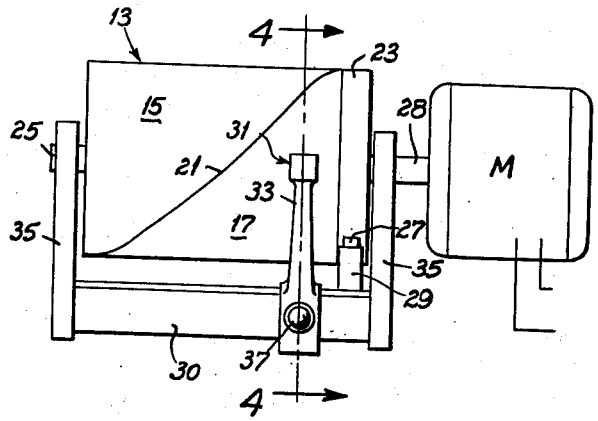
Fig. 3 is a front elevation of certain apparatus for varying the current supplied to the load.

The switch S is operated in timed relation with the A. C. voltage of the transformer secondary 3 by means of a motor M supplied from the A. C. power supply for the transformer primary 1. Referring to Fig. 3 of the drawings, there is shown a commutator generally designated 13. The commutator 13 comprises a cylinder 15 formed of insulating material and suitably recessed to receive a segment 17 formed of conductive material. The conductive segment is generally triangular in outline and of substantial dimension in the axial direction of the commutator, having an edge 19 generally parallel to the axis of the cylinder and a slanting edge 21 such that the width of the segment increases in an axial direction. A conductive slip ring 23, electrically connected to the conductive segment 17, is provided at one end of the commutator. The commutator is mounted upon a shaft 25 which is coupled to a drive shaft 28 of a motor M, which in turn is adapted to operate as a synchronous motor when running at normal speed. The motor could be of the type that starts as an induction motor, such motors being known in the art. For puposes to be described, the commutator is driven in such direction that the edge 21 of the conductive segment 17 leads the edge 19.

A brush 27 is fixed upon a support 29 so as continuously to engage the conductive slip ring 23. A second brush 31, carried by a brush holder 33, is adapted for sliding movement on a guide 30 in an axial direction with respect to the commutator. This brush 31 is movable the length of the conductive segment 17. The guide 30 is in turn mounted upon arms 35 pivoted to the shaft 25 so as to be rotary about the periphery of the commutator. A handle 37 facilitates axial movement of the brush 31 along the commutator, and rotation of both brushes about the commutator.

Figure 5:
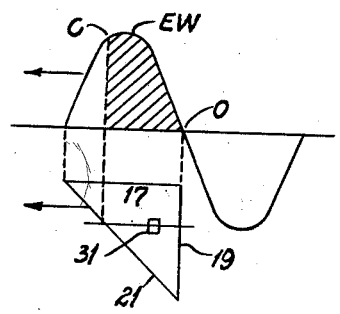
Fig. 5 is a diagram illustrating the synchronized relation between the operation of the switch contacts and the voltage of the A. C. source.

The width of the conductive segment 17 varies from an insignificant amount at the left end of the commutator (as viewed in Fig. 3) to an amount corresponding to one-half the circumference of the commutator at its other end. The motor M drives the commutator at a constant speed, which should be 3600 R. P. M. if the power source is 60 cycles and only one conductive segment is provided on the commutator. Consequently, the time during which the brush 31 is in engagement with the conductive segment 17 is determined by the position of the brush along the guide support 30. At one end (the left as viewed in Fig. 3), the brush is substantially disconnected from the conductive segment and at the other end the brush is in engagement with the conductive segment over one-half the revolution of the commutator. It is apparent that brush 31 and conductive segment 17 are the equivalents of switch contacts 7 and 11. Fig. 5 illustrates a developed view of the conductive segment relative to a sinusoidal voltage wave, such as applied by the voltage source E.

In Fig. 5, the voltage wave EW, representative of the voltage from the source E, and the conductive segment 17 should be considered as moving at equal rate to the left of the figure. The brush 31 should be considered as stationary with respect to the conductive segment. Thus, the switch is closed at a point C determined by the engagement of the brush 31 with the leading edge 21 of the conductive segment; and, the switch is opened at a point O where the brush passes over the trailing edge 19 of the conductive segment. By varying the brush position upwardly or downwardly as viewed in Fig. 5, variation of the switch-closing position C is obtained.

The area under the voltage wave curve EW between the switch-closing position C and the switch-opening position O determines the amount of current supplied to the load. Vertical movement of the brush in Fig. 5 corresponds to sliding movement of the brush on guide 30 in Fig. 3. Rotational movement of the support 30 in Fig. 3 corresponds to phase shifting of the conductive segment relative to the voltage wave EW of Fig. 5. This phase shifting permits the trailing edge 19 of the conductive segment to be positioned so that the switch is opened when the voltage wave EW swings from positive to negative. As will be pointed out, it is necessary that the switch be closed only during one of the half-cycles of the voltage wave EW.

Operation is as follows:

Assume the inductive coil L has a resistance of 50 ohms and a high inductance, for example, several henries. Also, assume the A. C. voltage from source E is 220 volts sinusoidal, and that the commutator is adjusted to pass current throughout a half-cycle of the voltage wave. Under these circumstances, the D. C. voltage appearing across the load will be .45 of the voltage from the voltage source, or 100 volts less the voltage drop of the switch contacts, which is insignificant. The D. C. current through the load will then be 2 amperes. The transformer-secondary current will be .71 of the load current, or about 1.4 amperes R. M. S. When the switch opens, the inductive load tends to sustain current flow, but this current is by-passed by the rectifier V and not applied to the switch contacts. The rectifier V has a small voltage drop, of the order of 5 to 10 volts, hence the switch contacts do not interrupt the inductive discharge current, which remains substantially 2 amperes. The switch must be opened before the voltage swings to the opposite polarity, because in that event current would flow from the voltage source E through the rectifier V, shorting the load. If the switch is properly opened, the current through the by-passing rectifier V will be supplied only by the inductance of the load.

Figure 6:
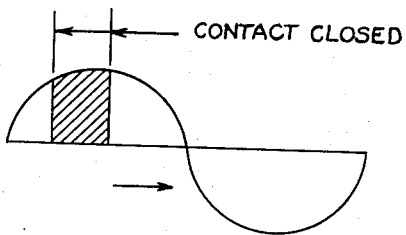
Fig. 6 is a voltage wave diagram illustrating an alternative synchronized relation between the operation of the switch contacts and the voltage of the A. C. source.
Figure 7:
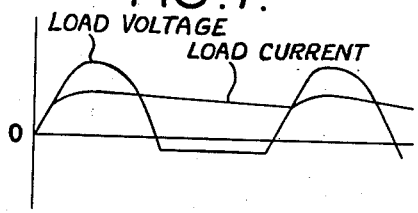
Fig. 7 is a wave diagram of the load voltage and current.

In Fig. 5, the switch opens when the transformer voltage is approximately zero; however, it has been found that the switch may be opened at a substantial transformer voltage as indicated in Fig. 6, without damage to the switch contacts. The load voltage and current for maximum current is indicated in Fig. 7, the portion below the zero axis representing the voltage drop of the valve-type rectifier.

Figure 8:
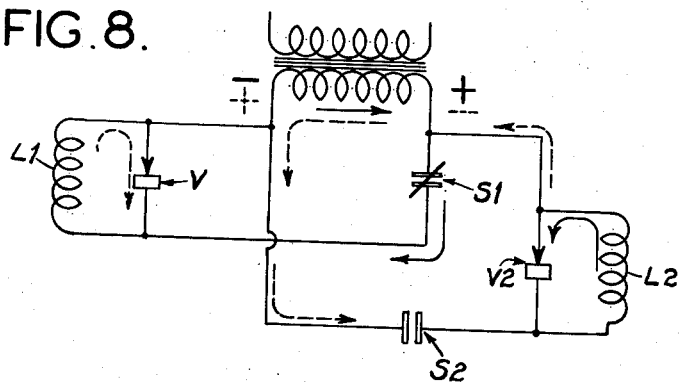
Fig. 8 is a circuit diagram illustrating an alternative arrangement.

Referring now to Fig. 8, there is shown a system adapted to make more efficient use of the transformer and prevent unbalancing of the electric power source. It will be noted that in the Fig. 1 system, power is drawn from the transformer during only one half-cycle, and this action produces an unbalancing effect on the power source which may be undesirable, particularly where the power source is relatively small compared to the size of the load, as in field installations. The arrangement shown in Fig. 8 is similar to that shown in Fig. 1, except that in addition to switch S1, a second switch S2, a second valve-type rectifier V2 and a second inductive load or field generating means L2 are provided. The switch S2 is closed when the switch S1 is open and vice versa. The voltage and current conditions during one of the half-cycle of the transformer voltage are shown by solid lines and during the other half-cycle of the transformer voltage are shown by dotted lines. When switch S1 is closed, load L1 is supplied with current from the transformer and at the same time load L2 is discharging through its associated by-passing rectifier V2 (see solid line arrows). On the other half-cycle of the transformer voltage, load L1 discharges through its by-passing rectifier V1 and load L2 is supplied with power from the transformer, switch S2 then being closed (dotted line arrows). It will be understood that the inductive loads L1 and L2 should be electrically and magnetically separated and approximately equal in order to obtain the advantages of this circuit.

Figure 9:
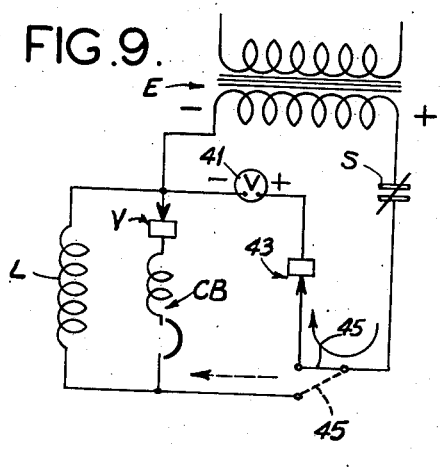
Fig. 9 is a circuit diagram showing the connection of certain electrical components adapted to facilitate adjustment of the apparatus to the desired synchronized relation between the voltage of the supply and the operation of the switch; and, Fig. 10 is a circuit diagram of a full-wave rectifying system.

As mentioned heretofore, the commutating switch must be properly phased with respect to the voltage wave in order that the switch is closed only during a particular half-cycle of the voltage, depending upon the connection of the valve-type rectifier. Fig. 9 illustrates certain apparatus for facilitating this phase-shifting adjustment. The circuit is the same as that shown in Fig. 1 with the exception that a circuit breaker CB with instantaneous overcurrent trip is series connected with the valve-type rectifier. Thus, if the phase should accidentally be such that the rectifier V shorts the power supply, the circuit breaker will trip to prevent damage from overcurrent.

A visual indication for the phase-shifting adjustment may be provided by a voltmeter 41 and a series-connected half-wave rectifier 43. A transfer switch 45 is provided to disconnect the load and rectifier V from the power source E and commutating switch S, and to connect the voltmeter and associated half-wave rectifier in series with the switch and power scource. The half-wave rectifier 43 is arranged to pass current as indicated or in the same direction that the load L is to receive current from the transformer. When the voltage on the voltmeter reaches a predetermined value, there is an indication that the switch S is properly phased with respect to the voltage wave, and the switch 45 may then be thrown to its other position to connect the load to the rectifier apparatus. An alternative arrangement would be to reverse the rectifier 43 and the voltmeter; and then adjust the phase until no voltage reading is obtained.

Figure 10:
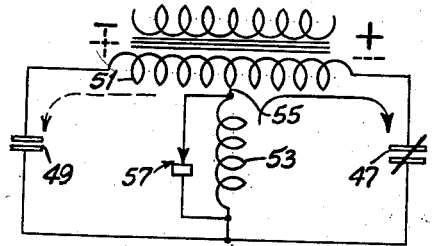

An alternative arrangement for full-wave mechanical rectification is illustrated in Fig. 10. Switches 47 and 49, operated by suitable synchronous motor means (not shown), are connected to opposite ends of a center-tapped transformer secondary 51, and an inductive load or field generating means 53 is connected between these switches and a transformer center tap 55. A valve-type rectifier 57 is connected across the load. Switch 47 is closed only when the polarity of the transformer secondary is such that current flow does not occur through the rectifier 57, this condition being indicated by solid lines in Fig. 10. When the transformer voltage switches to the opposite polarity, switch 47 is opened and switch 49 is closed (see dotted lines).

The particular value of this arrangement is that one switch may be opened before the other is closed without interrupting the load current, inasmuch as inductive discharge of the load may occur through the rectifier element 57. In saturable-reactor rectifying systems, variation of the load current is only possible by variation of the transformer voltage. The system of Fig. 10 permits full-wave rectification with variation of the load current by means of the switches 47 and 49. For example, the switches might be operated as indicated in Fig. 5 or 6.

In place of the voltmeter 41, a small pilot light may be employed. Also, it will be understood that suitable automatic apparatus could be employed for properly phasing the switch S with the voltage wave.

A selenium rectifier is preferred for the valve-type rectifier V because of its long life, and because there is no need for preheating as would be required for hot-cathode rectifier tubes.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Rectifying apparatus for exciting a pair of field coils supplied from an A. C. power supply, comprising a first mechanically operated switch connected between the power supply and one of the field coils, a second mechanically operated switch connected between the power supply and the other field coil, a pair of low voltage, non-polarizing, non-regenerative, low capacitance dry type rectifying elements permitting substantial current flow only from a first electrode to a second electrode, one of said rectifying elements being connected across one of the field coils and the other rectifying element being connected across the other field coil and synchronous motor means for operating the switches in synchronous relation with the A. C. voltage of the power supply, said first switch being closed only when a negative voltage is applied to the first electrode of its associated rectifying element and the second switch then being open, and the second switch being closed only when a negative voltage is applied to the first electrode of its associated rectifying element and the first switch then being open.

2. Full-wave rectifying apparatus for exciting a field coil supplied from a single-phase A. C. power supply, comprising a center-tap transformer connected across the power supply, a pair of mechanically operated switches at opposite ends of the transformer secondary, a connection from between the switches to the field coil and from the transformer center tap to the load, a low voltage, non-polarizing, non-regenerative, low capacitance dry type rectifying element connected across the field coil and synchronous mechanical motor means operating the switches in synchronized relation with the A. C. voltage across the transformer secondary, said motor means closing the switches respectively only when the transformer voltage is such that the transformer would not be shorted by the rectifying element.

3. Rectifying apparatus for exciting field generating means supplied from an A. C. power supply, comprising a first mechanically operated switch electrically connected between a first potential point of said power supply and said field generating means, a second mechanically operated switch connected between a second potential point of said power supply and said field generating means, the instantaneous polarity of said points being opposite, at least one rectifying element connected across at least a portion of said field generating means, said rectifying element being a low voltage, non-polarizing, non-regenerative, low capacitance dry type rectifying element which permits substantial current flow only from a first electrode to a second electrode, and synchronous motor means for operating the switches in synchronous relation with the A. C. voltage of the power supply, said first switch being closed only when a negative voltage is applied to the first electrode of its associated rectifying element and the second switch then being open, and the second switch being closed only when a negative voltage is applied to the first electrode of its associated rectifying element and the first switch then being open.

JERROLD B. WINTHER.

References Cited in the file of this patent

UNITED STATES PATENTS

| Number | Name | Date |
|---|---|---|
| 1,390,504 | Corbino | Sept. 13, 1921 |
| 1,591,186 | Russell | July 6, 1926 |
| 1,751,920 | Holbrook | Mar. 25, 1930 |
| 1,844,243 | Crout | Feb. 9, 1932 |
| 1,928,812 | Dawson | Oct. 3, 1933 |
| 1,982,007 | Logan | Nov. 27, 1934 |
| 1,982,329 | Stogoff | Nov. 27, 1934 |
| 2,100,715 | Jenks | Nov. 30, 1937 |

FOREIGN PATENTS

| Number | Country | Date |
|---|---|---|
| 348,086 | Great Britain | Oct. 28, 1929 |
| 908,240 | France | Jan. 25, 1944 |